(12) United States Patent
Groneberg

(10) Patent No.: US 11,919,209 B2
(45) Date of Patent: Mar. 5, 2024

(54) MACHINE TOOL

(71) Applicant: Nienstedt GmbH, Haltern am See (DE)

(72) Inventor: Jan Groneberg, Berlin (DE)

(73) Assignee: Nienstedt GmbH, Haltern am See (DE)

( * ) Notice: Subject to any disclaimer, the term of this patent is extended or adjusted under 35 U.S.C. 154(b) by 429 days.

(21) Appl. No.: 16/634,639

(22) PCT Filed: Aug. 3, 2018

(86) PCT No.: PCT/EP2018/071195
§ 371 (c)(1),
(2) Date: Jan. 28, 2020

(87) PCT Pub. No.: WO2019/025619
PCT Pub. Date: Feb. 7, 2019

(65) Prior Publication Data
US 2021/0070003 A1    Mar. 11, 2021

(30) Foreign Application Priority Data

Aug. 3, 2017 (EP) .................................... 17184763

(51) Int. Cl.
*B29C 43/50* (2006.01)
*B29C 43/00* (2006.01)
(Continued)

(52) U.S. Cl.
CPC .............. *B29C 43/50* (2013.01); *B29C 43/00* (2013.01); *B29C 43/02* (2013.01); *B29C 43/32* (2013.01);
(Continued)

(58) Field of Classification Search
CPC ................................ B29C 43/32; B29C 43/02
See application file for complete search history.

(56) References Cited

U.S. PATENT DOCUMENTS 2,594,204 A * 4/1952 Nowak ...................... B21J 9/12
  72/453.18
3,847,078 A * 11/1974 Krembel, Jr. ......... B44B 5/0061
  101/3.1
(Continued)

FOREIGN PATENT DOCUMENTS

CA      1280669 C    2/1991
CN      87100344 A   7/1987
(Continued)

OTHER PUBLICATIONS

Human translation JPS61135609A (Year: 1986).*
(Continued)

*Primary Examiner* — Jacob T Minskey
*Assistant Examiner* — Wayne K. Swier
(74) *Attorney, Agent, or Firm* — Bejin Bieneman PLC

(57) ABSTRACT

Machine tools for machining or processing a workpiece can include at least one tool with at least one relative movement between the workpiece and the tool. The machine tool has at least one pressure line circuit with at least one pump unit and with at least one energy storage which is in flow connection with the pump unit via a pressure line, wherein the pump unit has at least one mechanically driven pump element for sucking in or sucking out a medium and is in flow connection with the pressure line, and the pump element is mechanically coupled to a component of the machine tool which is also moved during proper operation of the machine tool in such a way that the component moved by the machine tool drives the pump element.

8 Claims, 3 Drawing Sheets

(51) Int. Cl.
  *B29C 43/02*  (2006.01)
  *B29C 43/32*  (2006.01)
  *B29C 45/00*  (2006.01)
  *F15B 1/02*   (2006.01)

(52) U.S. Cl.
  CPC .............. *B29C 45/00* (2013.01); *F15B 1/024* (2013.01); *B29C 2043/3233* (2013.01); *B29C 2043/3272* (2013.01); *B29C 2043/5053* (2013.01)

(56) References Cited

U.S. PATENT DOCUMENTS

| | | | | |
|---|---|---|---|---|
| 4,658,629 | A | * | 4/1987 | Milisavljevic .......... B30B 15/16 72/430 |
| 5,499,525 | A | * | 3/1996 | Kordak .................. B30B 1/266 100/259 |
| 6,379,119 | B1 | * | 4/2002 | Truninger ............. F04B 49/065 417/22 |
| 6,932,924 | B2 | * | 8/2005 | Nishizawa .............. B29C 45/66 425/451.2 |
| 2015/0273779 | A1 | * | 10/2015 | Daub ..................... B30B 15/28 100/264 |

FOREIGN PATENT DOCUMENTS

| | | | | |
|---|---|---|---|---|
| CN | 1461255 | A | | 12/2003 |
| CN | 1563714 | A | * | 1/2005 |
| CN | 101767443 | A | | 7/2010 |
| CN | 204701740 | U | | 10/2015 |
| CN | 105059274 | A | | 11/2015 |
| CN | 204877917 | U | * | 12/2015 |
| CN | 205343913 | U | | 6/2016 |
| CN | 205343913 | U | * | 6/2016 |
| CN | 205651682 | U | | 10/2016 |
| CN | 106734461 | A | | 5/2017 |
| DE | 1502282 | A1 | | 3/1969 |
| DE | 19830825 | A1 | | 1/2000 |
| DE | 102011001955 | A1 | | 10/2012 |
| DE | 102011001955 | A1 | * | 10/2012 ............. B30B 1/007 |
| EP | 1988781 | A1 | | 11/2008 |
| EP | 2774750 | A1 | | 9/2014 |
| JP | S60-18689 | U | | 2/1985 |
| JP | S61-135609 | U | | 8/1986 |
| JP | H06170471 | A | | 6/1994 |
| JP | H08215899 | A | | 8/1996 |
| JP | 2001205495 | A | | 7/2001 |
| JP | 2015188896 | A | | 11/2015 |

OTHER PUBLICATIONS

Machine translation CN1563714A (Year: 2004).*
Machine translation DE102011001955A1 (Year: 2012).*
Machine translation CN20487791U (Year: 2015).*
Machine translation CN2053434391U (Year: 2016).*
Chinese Office Action dated Apr. 26, 2021 for Application No. 201880049029.5 (15 pages; with English machine translation).
International Search Report and Written Opinion for PCT/EP2018/071195 dated Nov. 28, 2018 (12 pages; with English translation).
Extended European Search Report for EP 17184763 dated Feb. 6, 2018 (7 pages).
JPO Office Action dated Apr. 22, 2022 for application No. JP2020-505153 (21 pages; with English machine translation).

* cited by examiner

MACHINE TOOL

CROSS-REFERENCE TO RELATED APPLICATIONS

This application is a national stage of, and claims priority to, Patent Cooperation Treaty Application No. PCT/EP2017/071195, filed on Aug. 3, 2018, which application claims priority to European Patent Application No. EP 17184763.5, filed on Aug. 3, 2017, which applications are hereby incorporated herein by reference in their entireties.

BACKGROUND

Pressing devices for machining or processing a workpiece are known from EP 1 988 781 A1. This known pressing device is used for pressing food molds, whereby the applicability of the present invention is not limited to the type and design of the workpiece. The press plunger is first of all adjusted against an abutment in a stroke movement within a working cycle. The workpiece is thereby pressed and shaped in a mold cavity, which can be arranged in the abutment and/or in the press plunger. Afterwards, the press plunger is moved back again and the formed workpiece is removed.

Especially for the handling of unprocessed or finished workpieces, grippers, suction cups, ejectors or other over- or under-pressure-operated means for workpiece handling are often used, which are usually connected to a compressed air circuit available in the area of the production plant. In addition to these means for workpiece handling, other components or functions can also be realized with compressed air. In all cases, however, compressed air or a vacuum must be provided.

Especially in smaller companies or companies that only use one or a few industrial machines, the infrastructure usually available in larger companies is often not available. Especially in connection with the machining of workpieces that are not produced in the classic, large-scale industrial environment, an infrastructure with the supply of compressed air is often not available. In these cases, either the use of pneumatically or hydraulically driven components must be avoided or the infrastructure must be retrofitted at great expense.

A press is known from EP 2 774 750 A1, wherein the press has a pressure line circuit with a pumping unit, an energy storage device connected in flow communication to the pumping unit via a pressure line and a pressure outlet. At the pressure outlet, a pressure difference existing in the energy storage with respect to the ambient pressure can be tapped via a pressure supply line. The pumping unit is in flow communication with the pressure line and comprises a mechanically driven pumping element that can be moved back and forth for sucking in or extracting a medium.

In this embodiment, the pump unit is used to generate additional hydraulic pressure via a separate, motor-driven pump as hydraulic motor. This additional pressure is applied to the press plunger to overcome force peaks in addition to the actual forming force of the press. However, the hydraulic pressure is generated by a separate pump, which means a correspondingly high design effort.

From DE 10 2011 001 955 A1, a tool is known, having an upper tool and a lower tool, wherein the two tool parts are movable relative to each other and potential energy is built up in consequence of the processing as a result of the relative movement. The potential energy can then be subsequently dissipated, which is used to actuate an additional tool.

However, this tool is not able to provide and use the potential energy outside the tool. A similar solution is shown in DE 198 30 825 A1.

SUMMARY

The present document relates to a machine tool for machining or processing a workpiece. For this purpose, the generic machine tool has machining means comprising at least one tool, which is moved relative to the workpiece holder during the machining or processing of the workpiece. This machining means can, for example, be the spindle of a boring mill, the punch of a press or also the screw of an extruder. In particular, the machining means itself can be provided on the machine in a movable manner and can be equipped with one or more tools. However, the machining means can also be formed exclusively by the tool itself.

The present machining too can basically be used in connection with all machines which, during machining, move a component as part of the moving machining means via any drive technology. These can be machines with linearly moving components or machines with rotating components. In particular, these can be machine tools for machining, for example lathes, milling machines, planing benches, grinding machines, boring mills or similar machines. The machining tool is also applicable in connection with injection molding machines in which, for example, a worm gear is moved. Ultimately, the scope is limited only to such machines which, during operation, have a moving component which can be used in the intended manner.

In the present context, workpieces can be all possible shapes and forms of workpieces, i.e. metal components, plastic components as well as foodstuffs. A possible application may, for example, be a machine tool which is formed as a pressing device for the form pressing of the workpieces. Such a pressing device has at least one abutment surface and at least one press plunger which can be adjusted in a stroke movement against the abutment surface.

The machine tool has lower requirements for supply of working pressure than for building-side equipment.

A pumping element is directly or indirectly mechanically coupled with the machining means in such a way that the pumping element is moved during the machining or processing of the workpiece with the associated movement of the machining means. The movement of the machining means, which exists anyway due to the operation of the machine tool, is thus used to move the pumping element. This enables a simple construction of a positive or negative pressure generator even in a machine environment where compressed air or vacuum sources are not available.

The machine tool disclosed herein is characterized in in that the pneumatic energy storage used as a pressure storage is not located on the tool and is preferably not moved with the tool, but is arranged in a stationary manner on the non-moving parts of the machine tool. This means that it can be used to tap the stored energy in the form of compressed air or negative pressure for a wide variety of purposes. These can be pneumatically driven tools, ejectors or grippers or even compressed air guns used by the operator of the machine.

The pumping element of the pumping unit is moved over a component of the machine tool which moves with the machine tool during the intended operation of the machine tool, whereby it is mechanically coupled in such a way that the component moved by the machine tool is, or drives, the pumping element, but the remaining pumping unit is provided separately from the tool in a stationary manner. It is therefore not moved with the tool and is fluidically connected to an energy storage which is also not moved. Alternatively, of course, the pumping element can be stationary, while the chamber in which the pumping element is movable is coupled to the machining medium in such a way that it moves.

Advantageously, the machine tool itself can generate the pneumatic or even hydraulic infrastructure required by or in its immediate vicinity. On the one hand, some factory machines require hydraulic pressure or a pneumatic pressure themselves in order to perform functions. On the other hand, however, such a requirement may also exist in the immediate vicinity, for example in connection with the removal of workpieces from a fixture in which the workpiece has been machined or with the transfer of the workpiece from one machining station to another or to a conveyor belt. Cleaning of the machining area by compressed air can also be made possible, for example, independently of the local infrastructure.

In principle, the machine tool can have not only a linearly moving component for driving the pump unit, but also can have components that are driven by rotation. For this purpose, the rotational movement can be converted into a translatory movement or even a rotating component via the usual gears to generate the hydraulic or pneumatic pressure. In this context, for example, a construction similar to a Wankel engine can be used so that the piston of the pump unit is rotatably mounted in a hollow cylinder.

However, an easy implementation is possible with machine tools in which a translatory movement of a component of the machine can be exploited. This may be, for example, the pressing device already mentioned above. with the following description includes such a pressing device, but the features mentioned can also be transferred to the other devices mentioned above, even robots or logistics devices.

The connection with the moving component can be made directly or via a lever mechanism. A step-up gear can also be interposed, for example to move the pumping element faster or slower than the moving component. The component itself can also be the pumping element of the pump unit.

In a preferred application, a pneumatic positive or negative pressure can be provided. In this case, the gaseous medium used to produce the positive or negative pressure may be the air surrounding the production area. In principle, however, a closed system with another compressible medium can also be used.

Furthermore, in another preferred application, a hydraulic solution may also be used as pumping unit. In this case the machine would comprise a closed circuit of a liquid in which the pumping unit is provided in and which can, for example, convert the flow speed into air pressure or under pressure in a suitable manner. Of course, the flowing liquid and its flow pressure can also be used for other purposes. If a hydraulic solution is used, the hydraulic pressure can of can of course be provided by the compressing pressure generation. In this case, however, the pump unit can build up potential energy, for example by tensioning spring means, lifting weights or similar measures, which can then be used to call up the hydraulic pressure.

The central application disclosed herein, however, is the use of a pneumatic pump unit which can easily and simply generate an overpressure and transfer it into a pressure line. This pressure line is in flow connection with the pneumatic energy storage, whereby a pressure control valve connected upstream of the energy storage, which is provided in particular with a relief opening, ensures that the pressure in the pneumatic energy storage remains largely constant.

A pressure supply line runs from the pneumatic energy storage either to a transfer point at which compressed air or the vacuum can be tapped via a suitable interface, or directly to one or more pneumatic consumers. In this context, pneumatic consumers can be any means that can be operated via a vacuum or via compressed air. These can be, for example, the already mentioned grippers, ejectors, suction bells or other means of controlling the material flow or a function of the machine. A generated overpressure can also be used for pure cleaning purposes, for example to blow out the mold cavity of the pressing device or to clean the path covered by the workpiece after processing.

Suitable valves are provided in the pressure line to ensure that, in the case of a pump unit used as a compressor, the excess pressure is passed on in the direction of the pneumatic energy storage in this way, while in the suction mode of the compressor the valve closes and ambient air is drawn in, for example. This intake opening for the ambient air, in turn, can also be closed by a valve which closes automatically when excess pressure occurs in the discharge line and opens when suction pressure occurs. If the pump unit is a suction unit, these valves will of course work in the opposite direction.

An example uses a piston/cylinder unit as the pump unit. This unit may, for example, have a piston which is directly or indirectly connected to the press plunger of the pressing device. In this way, the piston is moved synchronously and alternately with the press plunger. If the running path of the press plunger and the piston is different, a gear unit can be used here which takes this into account.

In a possible example, a lifting rod of the press tool itself may also form the cylinder of the piston/cylinder unit. In this case, the cylinder is moved alternately, so that the piston is fixed, for example, by fastening it to a fixed component of the pressing device, and the necessary reduction or enlargement of the working space above or below the piston will then result from the cylinder movement. In the case of a separate piston/cylinder unit, on the other hand, the piston is more likely to be moved.

In principle, a first example has a pressure line circuit. The circuit can be fed by one or more pump units. Several pumping units are particularly useful if the pressing device has several individual lifting rods. However, it would also be possible to arrange several pump units around a single lifting rod. Furthermore, the pressure line circuit has the pressure line as well as the necessary valves, the pressure control valve, the pneumatic energy storage as well as the pressure supply line with the necessary connections and interfaces. Which specific interfaces and components are used depends essentially on the user's requirements.

A further example may also include two or more pressure line circuits. For example, a first pressure line circuit can be used to generate an overpressure, while another pressure line circuit is used to generate a vacuum. Different positive pressures can also be generated in this way. In these cases, a separate pneumatic energy storage will be provided for each pressure line circuit.

A different example, which can also be used in connection with the generation of different pressure values described above, feeds a pneumatic energy storage system with several pumping units. Thus, for example, one of two pumping units can run with a time delay to the other pumping unit by means of a suitable gear. The overlapping, sinusoidal pressure feeds can then be used to harmonize the function.

Another advantageous example finally uses a pump unit to feed two pressure lines. In this design, a first working space is used above the piston of the piston/cylinder unit, while the area below this piston is used as a second working space. Each working chamber is connected to a different pressure line. Although this has the disadvantage that the counterforce generated by the pumping action must be provided by the pressing force of the pressing device, this is tolerable for many applications. The advantage, however, is that a single cylinder can be used to realize two pumping units.

The combination of two pump units in one cylinder can be used, as well as the use of independent pump units, to feed either a common pressure line or two pneumatic energy storage systems. Depending on the design of the pressure circuits, such a function could theoretically also be offered as an alternative; for this purpose, appropriate connections of the pressure lines and the necessary valves would have to be provided.

SUMMARY OF THE DRAWINGS

Further fields of application, features and advantages of the present subject matter are described in the following examples of the design of a machine tool on the basis of the drawings. The following description of these preferred examples and also the above description is to be understood in such a way that it serves only to illustrate the basic ideas of the invention, but does not limit the scope and extent of the present invention.

In the drawings.

DESCRIPTION WITH REFERENCE TO THE DRAWINGS

Figure 1:
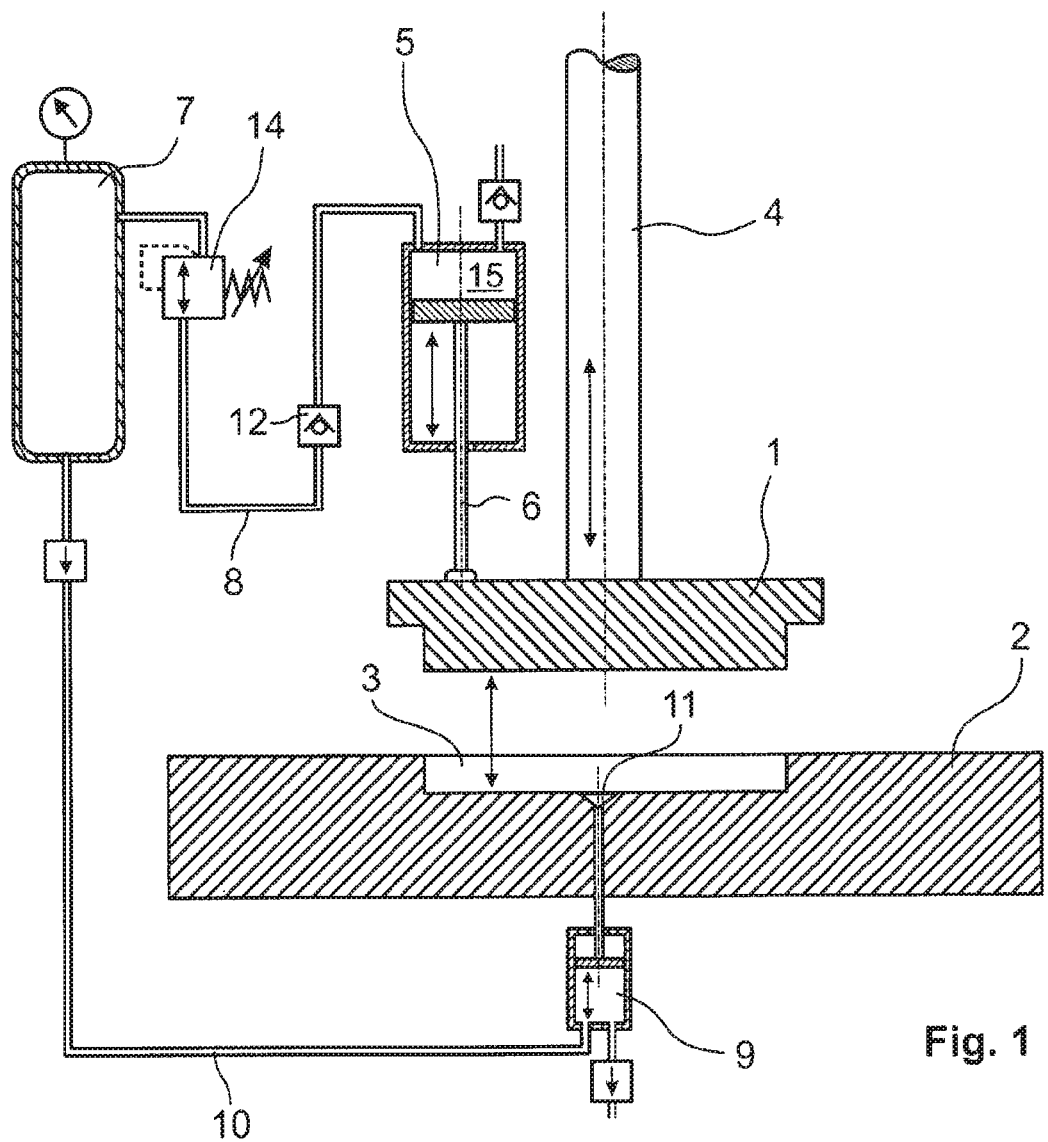
FIG. 1 shows a schematic view of a first configuration of the machine tool designed as a pressing device with a pump unit for generating an overpressure.

FIG. 1 shows a schematic view of a first possible design of the pressing device. This pressing device has a lifting rod 4, on which the press plunger 1 is provided in the lower area. The press plunger 1 is placed against an abutment surface 2, in which a mold cavity 3 for molding a workpiece not shown here is arranged.

In the design shown, a pneumatic consumer in the form of an ejector mandrel 11 is provided below the abutment surface 2. In order to be able to operate this without a separate compressed air connection, the machine is designed to be self-sufficient and has its own compressed air generation. The compressed air is generated by the pump unit 5, which is designed here as a piston/cylinder unit.

The piston/cylinder unit has a fixed cylinder in which a movable piston is moved back and forth, with the lower end of its piston rod, which forms the pump unit 5, resting on the surface of the press plunger 1. This connection with the press plunger 1 causes the piston to be both pushed up and pulled down, thus moving synchronously with the press plunger 1. The connection and geometry shown is of course only schematic, all other types of connections can be used here.

The piston/cylinder unit comprises a first working chamber 15 above the piston crown forming the pump unit 6, and a second working chamber 16 below the piston crown, which is not used in the example of FIG. 3. In the upper area, the suction possibility for ambient air, which is provided by an inlet valve, is shown.

Pressure lines 8 extend from the pump unit 5 to the pneumatic energy storage 7. To avoid larger pressure fluctuations in the pneumatic energy storage 7, a pressure control valve 14 is provided in pressure line 8 directly upstream of the pneumatic energy storage 7. Pressure valves 12, 13 control the function so that in the event of an excess pressure in the working chamber 15, 16 of the pump unit 5, this excess pressure is passed on to the pneumatic energy storage 7, while in the case of a vacuum, the respective pressure valve 12, 13 closes due to the opposite movement of the piston, thus preventing the air from being sucked back.

The pneumatic energy storage 7 in turn is connected to the pneumatic consumer 9 via a pressure supply line 10 with a switching valve in the design example shown. This pneumatic consumer 9 is also a piston/cylinder unit which uses the excess pressure in the pressure supply line 10 to move the ejector mandrel. The return of this mandrel can be spring-operated, for example. A switching valve is assigned to the pneumatic consumer 9, via which the excess pressure can be released to reset the ejector mandrel. This requires, via the load of the next workpiece lying in the mold cavity 3, the pressure of the press plunger 1, the weight of the piston or, if this is not sufficient, via a return spring (not shown here).

Figure 2:
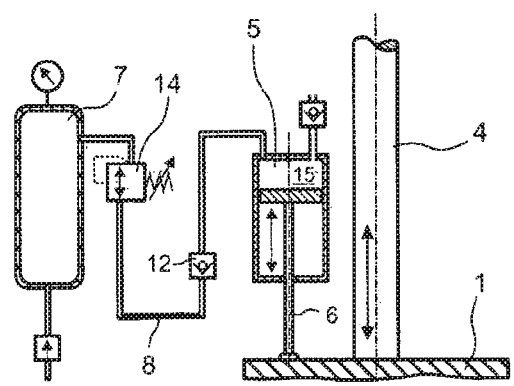
FIG. 2 shows the area of the pumping unit similar to the design according to FIG. 1, where the pumping unit is turned over to create a vacuum.

FIG. 2 shows a variant of the machine tool designed as a pressing device as shown in FIG. 1. In this case, pump unit 5 is used differently to generate a vacuum, so that pressure valve 12 closes when the piston of pump unit 5 is raised and still used as pump unit 6, and opens when the piston is lowered, so that gaseous medium can be sucked out of the energy storage 7.

Figure 3:
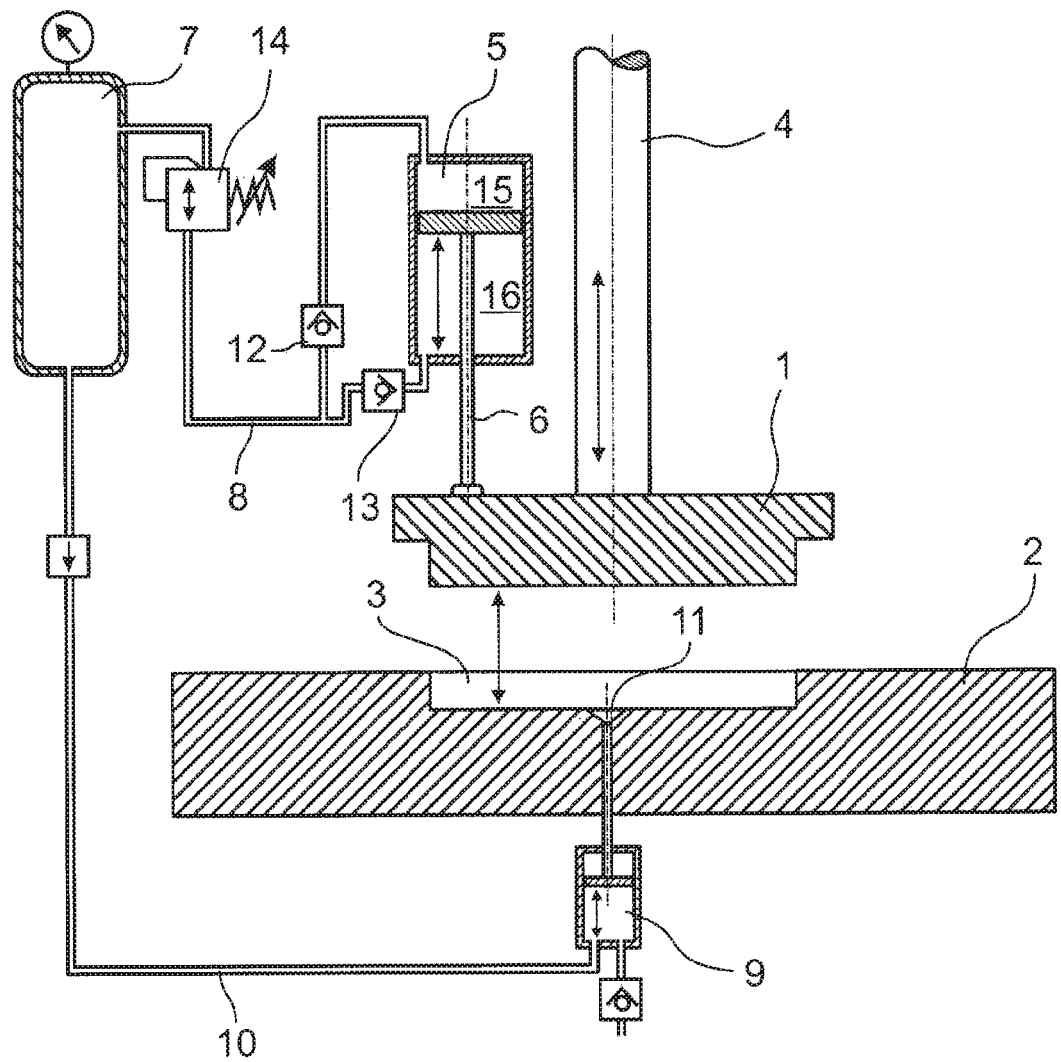
FIG. 3 shows a variant of the machine tool designed as a pressing device with a pressure circuit, but where both movements are used to generate an overpressure.

FIG. 3 shows a further variation. Here, the pump unit 5 is designed in such a way that both movements in the forward and backward direction of the pump unit 6 can be used to generate overpressure. For this purpose, a pressure outlet is provided both in the upper area of the piston and in the lower area of the piston, which is in flow connection with pressure line 8 via a pressure valve 12, 13.

Figure 4:
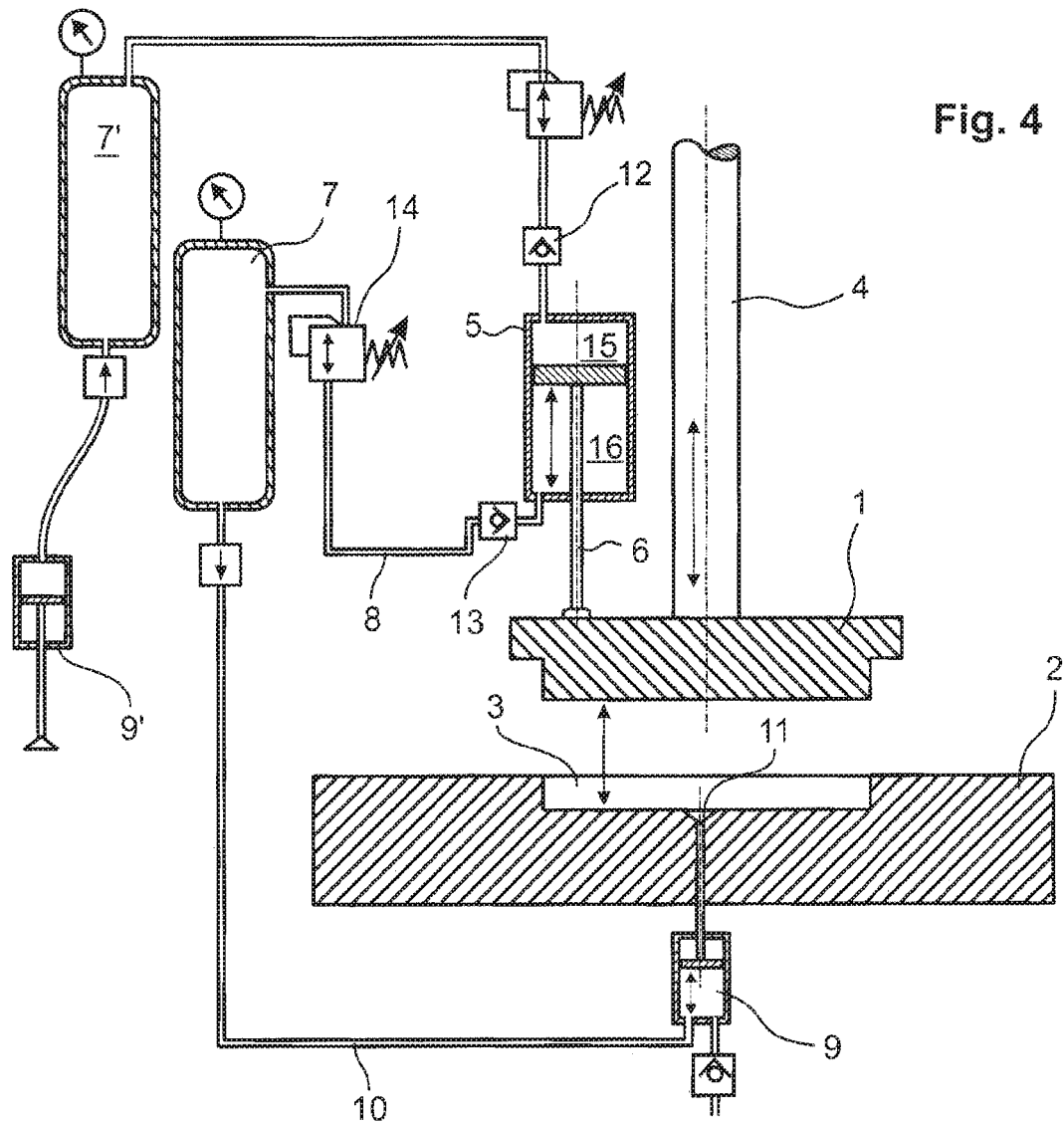
FIG. 4 shows a variant of the machine tool designed as a pressing device with two pressure circuits and two energy storage systems.

FIG. 4 shows a variant with two pressure circuits and two energy storage devices 7, 7'. A second pneumatic energy storage 7' is thus provided here, whereby the pump unit 5 here also has two working chambers 15, 16. In contrast to the design of the invention shown in FIG. 3, however, here the two working chambers 15, 16 are connected to different pressure line circuits. Via the pressure line 8, the lower working chamber 16 is connected to the pneumatic energy storage 7, which here also has a pressure control valve 14. In this respect this function does not differ from the function shown in FIG. 1.

The upper working chamber 15, on the other hand, interacts with another pressure line circuit which is connected to the second pneumatic energy storage 7', which also has a pressure regulating valve 14. The pressure valve 12 is intended here to form a vacuum pump, so that the piston of the pumping element 6, which generates a vacuum in the second working chamber 15 when shutting down, sucks the air out of pressure line 8 of this second pressure line circuit.

If the piston now moves up again, the air in the piston is expelled after closing the pressure valve 12 via an expulsion opening not shown here, which is closed via a valve which does not work in the opposite direction to the pressure valve 12. Of course, this ejection opening could also be connected to the first pressure line circuit, so that the same working chamber 15 can be used on the one hand as a suction chamber and on the other hand as a chamber generating overpressure. This also applies, of course, to the opposite side of the piston crown in the area of working chamber 16 located there in the case of the variant shown in FIG. 3.

As an example, here the second pneumatic reservoir 7' is combined with a suction chamber, which can be used as a gripper as a pneumatic consumer 9' for the workpiece and can be moved, for example, by means of a robot-like arm. The design of the first pressure line circuit and its connection to the first pneumatic consumer 9 is no different from the variant described in connection with FIG. 1.

Figure 5:
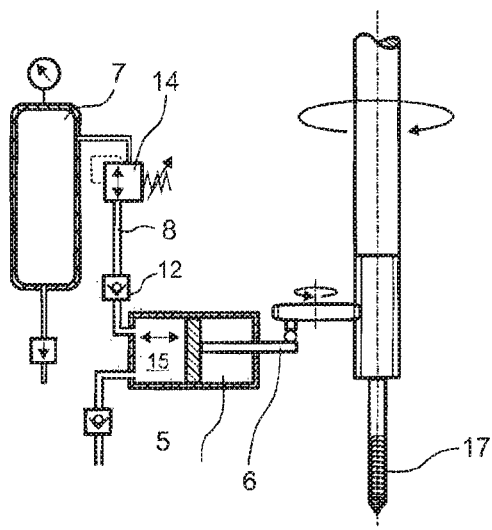
FIG. 5 shows the machining area of a machine tool designed as a boring mill with conversion of the rotational movement of the machining area into a translational movement of the pumping element.

FIG. 5 shows a variant of the machine tool, which is designed as a boring mill or drilling machine with a drilling tool 17. Here only the area of the machining medium, the pump unit 5 and the energy storage 7 is shown. Behind the pump unit 5 the pressure line 8 and the energy storage 7 with the valve means already described above are provided. This area does not differ from the variants described above. In the version shown, an overpressure is generated, but the variant shown in FIG. 2 can also be implemented just as well to generate a negative pressure in connection with this machine tool.

It can be seen here that in an exemplary design, the spindle of the machining means of the machine tool has an external toothing which meshes with a schematically shown gear wheel arranged next to it. As a result, this gearwheel is set in rotation, which is converted into a translatory movement of the pump unit 6 via the lever gear shown below.

Figure 6:
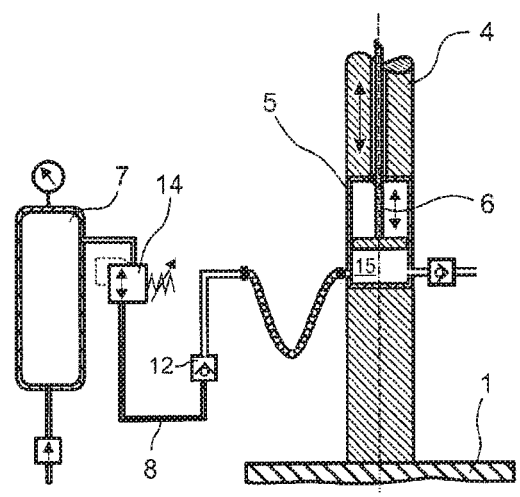
FIG. 6 shows shows a schematic view of a further design of a machine tool designed as a pressing device with a pump unit integrated in the press ram.

FIG. 6 shows a further variant of the machine tool, which is also designed as a pressing device. Here the pump unit 5 is integrated into the lifting rod 4, which forms the punch of the press. The pump unit 6 is guided upwards through a hollow cylindrical area of the lifting rod 4 and with an area of the machine tool that does not move with the lifting rod 4. The design shown is only an example, many variants are possible. Since in this design the pump unit 5 moves with the tool, i.e. the lifting rod 4, the front area of the pressure line 8 upstream of the pressure valve 12 is designed as an elastic line, at least in sections, so that the pressure outlet from the pump unit 5 can move with the tool.

LIST OF REFERENCE SIGNS

1 Press plunger
2 Abutment surface
3 Mold cavity
4 Lifting rod
5 Pump unit
6 Pump element
7, 7' Pneumatic energy storage
8 Pressure line
9, 9' Pneumatic consumer
10 Pressure supply line
11 Ejector mandrel
12 Pressure valve
13 Pressure valve
14 Pressure control valve
15 Working room
16 Working room
17 Drilling tool

The invention claimed is:

1. An apparatus for machining or processing a workpiece that can be positioned in a workpiece holder, comprising:
   at least one tool that is movable relative to the workpiece holder during the machining or processing of the workpiece, wherein the apparatus is a press device for the form-pressing of workpieces, and includes a component movable by the press device in a reciprocal stroke movement during the machining of the workpiece; and
   at least one pressure line circuit having at least one pump unit and at least one energy storage, which is in flow connection with the pump unit via a pressure line, and a pressure outlet, at which a pressure difference present in the energy storage with respect to the ambient pressure can be tapped via a pressure supply line that runs from the energy storage to a pneumatic consumer;
   wherein the pump unit has at least one mechanically driven pump element movable back and forth for sucking in or sucking out a medium and being in flow connection with the pressure line; and
   wherein the pump element is directly or indirectly mechanically coupled to the apparatus in such a way that during the machining or processing of the workpiece the pump element is driven by movement of the tool;
   wherein the pump unit is a compressor in the form of a piston/cylinder unit for building up a pneumatic overpressure arranged to suck in a gaseous medium and press it into the pressure line in a compressed state, wherein the energy storage is a pneumatic pressure storage with a pressure vessel with an internal pressure which is higher than the ambient pressure, wherein the pump unit is a piston/cylinder unit;
   wherein a piston of the piston/cylinder unit is coupled to the stroke movement of the movable component of the press device, and the piston/cylinder unit has a working chamber arranged on one side of the piston;
   wherein the working chamber is in flow connection with the pressure line having a pressure valve;
   wherein the pressure valve in the case of a pump unit that is a compressor permits a flow from the piston/cylinder unit to the pneumatic energy storage, and is capable of blocking automatically in the opposite direction, or in the case of a pump unit that is a suction unit permits a flow from the pneumatic energy storage to the piston/cylinder unit and is capable of blocking automatically in the opposite direction;
   wherein the press device comprises two separate pressure line circuits, each of the pressure line circuits comprising at least one energy storage and a pressure line; and
   wherein one of the pressure line circuits is a pressure line circuit carrying over-pressure with a compressor as pumping unit, and one of the pressure line circuits is a pressure line circuit carrying under-pressure with a suction unit as pumping unit.

2. The apparatus of claim 1, wherein at least one pump unit is a suction unit for building up a pneumatic vacuum for sucking gaseous medium out of the pressure line, wherein the pneumatic energy storage is a pressure vessel with an internal pressure which is lower than the ambient pressure.

3. The apparatus of claim 1, wherein at least one pump unit is a pump for building up a hydraulic pressure arranged for sucking in a fluid and pressing it into the pressure line, wherein the energy storage is a storage for storing potential energy, which has a device for converting a hydraulic pressure into potential energy and potential energy into hydraulic pressure.

4. The apparatus of claim 1, wherein the piston/cylinder unit has a respective working chamber on both sides of the piston, one of the working chambers being in flow communication with a first pressure line circuit carrying negative or positive pressure, and a second working chamber arranged on the opposite side of the piston being in flow communication with a second pressure line circuit carrying positive or negative pressure.

5. The apparatus of claim 1, wherein the pneumatically driven consumer is an overpressure-driven ejector mandrel or a vacuum-driven suction cup as part of a workpiece handling system.

6. The apparatus of claim 1, further comprising, at least one press plunger which can be set in a lifting movement against the abutment surface, wherein the movable component is the press plunger or a component of the press device connected to a lifting rod of the press plunger.

7. The apparatus of claim 6, wherein a stroke rod is cylindrically hollow at least in parts of the stroke rod, and forms the cylinder of the piston/cylinder unit.

8. An apparatus for machining or processing a workpiece that can be positioned in a workpiece holder, comprising:
- at least one tool that is movable relative to the workpiece holder during the machining or processing of the workpiece, wherein the apparatus is a press device for the form-pressing of workpieces, and includes a component movable by the press device in a reciprocal stroke movement during the machining of the workpiece; and
- at least one pressure line circuit having at least one pump unit and at least one energy storage, which is in flow connection with the pump unit via a pressure line, and a pressure outlet, at which a pressure difference present in the energy storage with respect to the ambient pressure can be tapped via a pressure supply line;
- wherein the pump unit is a compressor for building up a pneumatic overpressure arranged to suck in a gaseous medium and press it into the pressure line in a compressed state, wherein the energy storage is a pneumatic pressure storage with a pressure vessel with an internal pressure which is higher than the ambient pressure;
- wherein the pump unit has at least one mechanically driven pump element movable back and forth for sucking in or sucking out a medium and being in flow connection with the pressure line; and
- wherein the pump element is directly or indirectly mechanically coupled to the apparatus in such a way that during the machining or processing of the workpiece the pump element is driven by movement of the tool;
- wherein the pump unit is a compressor in the form of a piston/cylinder unit for building up a pneumatic overpressure arranged to suck in a gaseous medium and press it into the pressure line in a compressed state and energy storage is a pneumatic pressure storage with a pressure vessel with an internal pressure which is higher than the ambient pressure; and
- wherein a piston of the piston/cylinder unit is coupled to the stroke movement of the movable component of the press device, and the piston/cylinder unit has a working chamber arranged on one side of the piston;
- wherein the working chamber is in flow connection with the pressure line having a pressure valve;
- wherein the pressure valve permits a flow from the piston/cylinder unit to the pneumatic energy storage, and is capable of blocking automatically in the opposite direction;
- wherein the apparatus comprises a pressure supply line having a controllable control valve and which runs directly to one or more pneumatically loaded consumers which are in flow connection with the energy storage via the pressure supply line or wherein the pressure supply line runs from the pneumatic energy storage to a transfer point at which compressed air is tapped via a suitable interface,
- wherein the press device has at least one abutment surface and at least one press plunger which can be set in a lifting movement against the abutment surface,
- wherein the movable component is a lifting rod of the press plunger and the lifting rod includes a hollow cylindrical area that forms the cylinder of the piston/cylinder unit such that the pump unit is integrated into the lifting rod, and
- wherein the pump element is guided upwards through the hollow cylindrical area of the lifting rod and is connected with an area of the machine tool that does not move with the lifting rod.

* * * * *